3,349,545
PROCESS FOR THE PURIFICATION OF RAW CRACKED GASES CONTAINING ACETYLENE
Virgilio Stocchi and Augusto Magelli, Mestre, Venezia, and Giobatta Baisero, Tolmezzo-Udine, Italy, assignors to Montecatini Edison S.p.A., Milan, Italy
No Drawing. Filed May 5, 1965, Ser. No. 453,481
Claims priority, application Italy, May 12, 1964, 10,383/64
2 Claims. (Cl. 55—65)

ABSTRACT OF THE DISCLOSURE

Process for the purification of acetylene-containing gases obtained from the cracking of hydrocarbons, and including naphthalenic and other impurities and wherein the gas is subjected to an extraction step for recovering acetylene from these other impurities, the improvement being that the gas is treated prior to this latter separation with tetrahydronaphthalene or decahydronaphthalene at 15° C. to 40° C. and atmospheric pressure to initially remove the naphthalenic compounds and prevent them from obstructing subsequent purification.

---

This invention relates to a process for the purification of raw cracked gases containing acetylene obtained by the thermic decomposition, for example cracking or partial combustions, of methane or other gaseous, liquid or liquefied hydrocarbons.

Such raw gases contain besides acetylene variable amounts of hydrogen, carbon monoxide, carbon dioxide, methane, other unsaturated compounds such as olefines and higher homologues of acetylene and also appreciable amounts of aromatic hydrocarbons such as benzene, naphthalene and acenaphthylene, depending on the nature of the cracking process and on the type of treated hydrocarbon.

To separate the acetylene from this raw gaseous mixture, the raw cracked gases are generally cooled and freed from carbon black which accompanies it, compressed and passed through a selective solvent for the acetylene, the acetylene remaining dissolved while the insoluble gaseous components escape. The acetylene is then recovered from the solvent by fractionally reducing the pressure on the solvent and/or increasing its temperature so as to boil off the acetylene, the solvent being recycled after purification.

Acetylene obtained in this way is about 98 to 99% pure and will then usually be subjected to a further purification, for example by washing it under atmospheric pressure with concentrated sulphuric acid to free it from the remaining impurities, and in particular unsaturated compounds, which can not be completely separated by the fractional dissolution.

During these purifying operations, however, some of the substances contained in the raw gas, and in particular naphthalene and acenaphthylene, are often in condition of saturation in the acetylene gas which entrains them and can produce deposits, fouling or even clogging piping and treating apparatus with the result that there have to be frequent shut-downs for maintenance purposes. These substances are very easily deposited during the compression stage and the usual place which they clog is compressor coolers located between the cracking stage and compression stage.

In order to eliminate these substances it has been suggested that the raw cracked gases should be washed before the compression stage with a solvent for those substances which give rise to the deposits. The solvents so far suggested have disadvantages. Many have the inconvenience of absorbing together with the naphthalene, and other undesirable components, acetylene, resulting in a reduced yield; higher acetylenes, which tend to polymerize in the solvent, thereby contaminating it and giving rise to deposits; and water whose absorption produces a decrease in the power of the solvent to dissolve the naphthalene. Such a solvent must, therefore, be subjected to difficult and costly operations such as the recovery of the dissolved acetylene, elimination of the polymers formed in the presence of higher acetylenes and elimination of the water, besides of course the elimination by distillation or stripping of the naphthalene and other naphthalenic compounds absorbed, before the solvent can be recycled.

Other solvents suggested have a high volatility which results in appreciable losses of the solvent, which is taken along with the partially purified gases and increases the work of the following compressor and may produce some difficulties in the selective absorption of the acetylene.

According to the invention these difficulties and disadvantages are overcome or at least reduced by providing a process for the purification of raw cracked gases, containing acetylene, in which before the compression step the raw gases are washed with at least one hydrogenated naphthalenic compound, especially tetrahydronaphthalene (tetraline) and/or decahydronaphthalene (decaline), so as to remove easily condensable compounds such as naphthalenic compounds from the raw gases. Preferably this washing is effected at substantially atmospheric pressure and at room temperatures, for example, from 15 to 40° C.

By washing the raw cracked gas in this way a substantially complete selective absorption of the easily condensable impurities, such as naphthalene and acenaphthylene, occurs and at the same time substantially no absorption of acetylene, higher acetylenes and water occurs, there are negligible losses of the washing compound because of its low vapor pressure under these conditions, the solvent power of the washing compound for the naphthalene and acenaphthylene is practically constant, the washing compound is easily regenerated for recycling, and the washing compound does not form an azeotropic mixture with any of the components.

In a typical purification the cracked raw gas is cooled and freed from carbon black. It is then led in at the bottom of a washing tower, for example a tower packed with Raschig and Pall rings, while the washing liquid is sprayed in at the top of the tower. The washed gases escape from the top of the tower, while from the bottom the washing liquid is discharged, containing impurities dissolved therein, and after a suitable purification treatment it is recycled.

According to a preferred method of operation the efficiency of the washing is kept substantially constant by continuously taking away a part of the washing liquid for purification by means of steam distillation or stripping of the dissolved compounds and then recycling this purified liquid together with the remainder of the washing liquid.

For a good purification of the cracked gas, the washing liquid should preferably have a naphthalene concentration, at a temperature of 35° C., of below 10 g./l.

According to another feature of the invention it has been found to be advantageous to provide a process for the purification of raw cracked gases, contained acetylene, in which the raw gases are first washed with at least one hydrogenated naphthalene compound and are then washed under pressure with sulphuric acid having a concentration of 40 to 100% by weight, preferably 70 to 98% by weight.

The washing with sulphuric acid is preferably effected at a temperature of 25 to 40° C., under such a pressure that the partial pressure of the acetylene in the raw gas is from 0.5 to 1.4 atmospheres (absolute) preferably from 0.8 to 1.2 absolute atmospheres, corresponding to a total pressure of from 5 to 24 absolute atmospheres.

This successive treatment under pressure with the sulphuric acid eliminates the unsaturated compounds and particularly butadiene and the higher homologues of acetylene which separated only with difficulty from the acetylene and which could produce harmful contamination and formation of polymers in the solvent employed in the concentration stage for the acetylene.

The impurities absorbed by the sulphuric acid are directly and economically eliminated from the raw gases and are recovered together with the discharged sulphuric acid, for example by using it as is in the production of fertilizers and so avoiding the rather complicated and costly separation of these impurities from the sulphuric acid, as well as by recycling, together with purified acid, some impurities which inevitably remain therein.

After the raw gases have been washed with the hydrogenated naphtalenic compound or with both this compound and the sulphuric acid, the acetylene in the gases can be concentrated by the usual selective solvents. Also by washing in accordance with the invention there is a saving of these selective solvents either because the losses of solvents combined with the polymer are reduced, or because the amount of solvent which has to be regeneration is reduced with a consequent reduction in the loss of solvents.

The invention will now be illustrated with reference to the following examples.

*Example 1*

65 m.³/hr. S.T.P. of cracked gases containing 9.46% by volume of acetylene and the impurities indicated in column 1 of Table 1 were fed at a temperature of 30° C. and a pressure of 784 mm. Hg (1.035 atmospheres, absolute) to the base of a washing column 1050 mm. high and with a diameter of 250 mm. filled with Pall rings having a diameter of 25 mm. The gases were washed in countercurrent with 1200 l./hr. of tetrahydronaphthalene, partly from the recycle and partly fresh, at a temperature of 35° C. The gases coming out from the top of the column contained the impurities indicated in column 2 of Table 1 and were practically free from naphthalene and acenaphthylene, the traces shown in the table amounting to not more than 1 p.p.m. The gases were then sent, after compression and eventual further purification, to a concentration apparatus for the acetylene.

The washing tetrahydronaphthalene taken from the base of the column and containing the condensable impurities dissolved in it had a naphthalene content of 9 g./l. and the major part of it was recycled as such. The remainder, 1.5 l./hr., was freed by means of stripping from the absorbed compounds and was then returned to the washing liquid in the cycle.

TABLE 1

| Component | Percentage by Volume | |
|---|---|---|
|  | 1 | 2 |
| Acetylene | 9.46 | 9.46 |
| Propylene | 0.008 | 0.008 |
| Allene | 0.040 | 0.040 |
| Propyne | 0.063 | 0.063 |
| 1,3-butadiene | 0.002 | 0.002 |
| Monovinylacetylene | 0.017 | 0.017 |
| Diacetylene | 0.177 | 0.177 |
| Triacetylene | 0.005 | 0.005 |
| Naphthalene | 0.003 | (¹) |
| Acenaphthylene | 0.001 | 0 |

¹ Traces.

*Example 2*

65 m.³/hr. S.T.P. of cracked gases containing 9.52% by volume of acetylene and the impurities indicated in column 1 of Table 2 were fed at a temperature of 30° C. and a pressure of 784 mm. Hg into a washing column as described in Example 1. From the top of the column there was sprayed 1200 l./hr. of tetrahydronaphthalene at a temperature of 35° C. The outflowing gases from the column contained the impurities indicated in column 2 of Table 2.

The tetrahydronaphthalene washing liquid was taken from the base of the column and had a naphthalene concentration of 7 g./l. 2 l./hr. of the discharged washing liquid were sent to a purification unit before being recycled to the top of the column together with the remaining washing liquid.

TABLE 2

| Component | Percentage by Volume | |
|---|---|---|
|  | 1 | 2 |
| Acetylene | 9.52 | 9.52 |
| Propylene | 0.009 | 0.009 |
| Allene | 0.045 | 0.045 |
| Propyne | 0.068 | 0.068 |
| 1,3-butadiene | 0.001 | 0.001 |
| Monovinylacetylene | 0.018 | 0.018 |
| Diacetylene | 0.168 | 0.168 |
| Triacetylene | 0.005 | 0.005 |
| Naphthalene | 0.003 | (¹) |
| Acenaphthylene | 0.002 | 0 |

¹ Traces.

*Example 3*

70 m.³/hr. S.T.P. of cracked gases containing 10.2% by volume of acetylene and the impurities indicated in column 1 of Table 3 were fed at a temperature of 30° and a pressure of 784 mm. Hg into a washing column as described in Example 1, and from the top of the column there was sprayed 1200 l./hr. of tetrahydronaphthalene at a temperature of 35° C. The outflowing gas from the column contained the impurities indicated in column 2 of Table 3.

The tetrahydronaphthalene washing liquid was taken from the base of the column and had a naphthalene concentration of 9 g./l.

The cracked gases were thereafter compressed to a pressure of 9 atmospheres (absolute) and sent at a temperature of 30° C. to a sulphuric acid washing column fed with 1.3 l./hr. of fresh acid having a concentration of 97.8% by weight. The washed gases contained the impurities indicated in column 3 of Table 3. The sulphuric acid was discharged and had a concentration of 74.5% by weight.

TABLE 3

| Component | Percentage by Volume | | |
|---|---|---|---|
|  | 1 | 2 | 3 |
| Acetylene | 10.2 | 10.2 | 10.2 |
| Propylene | 0.01 | 0.01 | 0.002 |
| Allene | 0.04 | 0.04 | 0.017 |
| Propyne | 0.09 | 0.09 | 0.007 |
| 1-3-butadiene | 0.01 | 0.01 | 0 |
| Monovinylacetylene | 0.03 | 0.03 | 0.003 |
| Diacetylene | 0.35 | 0.35 | 0.26 |
| Triacetylene | 0.012 | 0.012 | (¹) |
| Naphthalene | 0.0035 | (¹) | 0 |
| Acenaphthylene | 0.001 | 0 | 0 |

¹ Traces.

What we claim is:

1. In a process for the purification of crude cracking gas obtained from the thermal treatment of hydrocarbons and containing primarily acetylene, naphthalenic compounds and other impurities at least one of which is propylene, allene, propene, 1,3-butadiene, monovinylacetylene, diacetylene and triacetylene, and wherein said other impurities are separated from the acetylene of said gas, the improvement which comprises the steps of:

treating said gas, prior to the separation of said other impurities from the acetylene thereof, with liquid tetrahydronaphthalene or decahydronaphthalene at substantially atmospheric pressure and a temperature of substantially 15° C. to 40° C. to extract said naphthalenic compounds from the gas;

thereafter compressing the gas to a pressure of substantially 5 to 24 atmospheres and an acetylene partial pressure of 0.5 to 1.4 atmospheres; and washing the compressed gas with sulphuric acid having a concentration of 40% to 100% by weight, at a temperature of 25° C. to 40° C. to remove said other impurities.

2. The improvement defined in claim 1 wherein the partial pressure of acetylene in the compressed gas is 0.8 to 1.2 atmospheres upon treatment with sulphuric acid, and the concentration of the sulphuric acid is substantially 70% to 98% by weight.

References Cited
UNITED STATES PATENTS

| 1,854,770 | 4/1932 | Speer | 55—30 |
| 2,796,951 | 6/1957 | Bogart | 55—1 |
| 2,870,867 | 1/1959 | Bartholome et al. | 55—51 |
| 3,201,920 | 8/1965 | Grubb et al. | 55—63 |
| 3,233,388 | 2/1966 | Karwat et al. | 55—73 |
| 3,255,270 | 6/1966 | Teltschik | 260—679 |

FOREIGN PATENTS 523,517   4/1931   Germany.

OTHER REFERENCES

Rose et al.: "The Condensed Chemical Dictionary," Reinhold Publishing Corp., 1961, p. 1123.

REUBEN FRIEDMAN, *Primary Examiner.*

C. HART, *Assistant Examiner.*